United States Patent [19]

Bodnar

[11] Patent Number: 5,974,129
[45] Date of Patent: Oct. 26, 1999

[54] DISTRIBUTED VIRTUAL CACHE METHOD FOR USE IN A DATABASE QUERY CONTROL SYSTEM

[75] Inventor: Bohdan Lew Bodnar, Park Ridge, Ill.

[73] Assignee: Lucent Technologies Inc., Murray Hill, N.J.

[21] Appl. No.: 08/861,364

[22] Filed: May 21, 1997

[51] Int. Cl.[6] .................................................. H04M 3/42
[52] U.S. Cl. ........................ 379/207; 379/219; 379/220
[58] Field of Search .................................... 379/216, 220, 379/219, 207, 210, 242

[56] References Cited

U.S. PATENT DOCUMENTS

| 5,717,748 | 2/1998 | Sneed, Jr. et al. | 379/219 X |
| 5,748,724 | 5/1998 | Sonnenberg | 379/207 X |
| 5,764,745 | 6/1998 | Chan et al. | 379/220 X |

Primary Examiner—Creighton Smith
Attorney, Agent, or Firm—Michael B. Johannesen

[57] ABSTRACT

A system and method for caching frequently called numbers so that call delivery time is shortened and the signaling network and service nodes are not overloaded by telephone number queries. In a distributed control switching system, each processor that performs digit analysis and has an area of memory. This area of memory is used as a cache to store directory number translation information. When a call arrives for a specified directory number (DN), if, after standard translation, the call cannot be normally routed, then the cache is consulted to determine whether the destination for that DN is in the cache. If it is, then the call is routed to the destination associated with the DN. If, however, the DN is not in the local cache, then a query is sent to one or more other units in the switch which may contain such caches in order to determine if these caches contain the destination. This "distributed" query is still faster than querying a centralized database because all data queries throughout the switch are carried out in parallel.

6 Claims, 5 Drawing Sheets

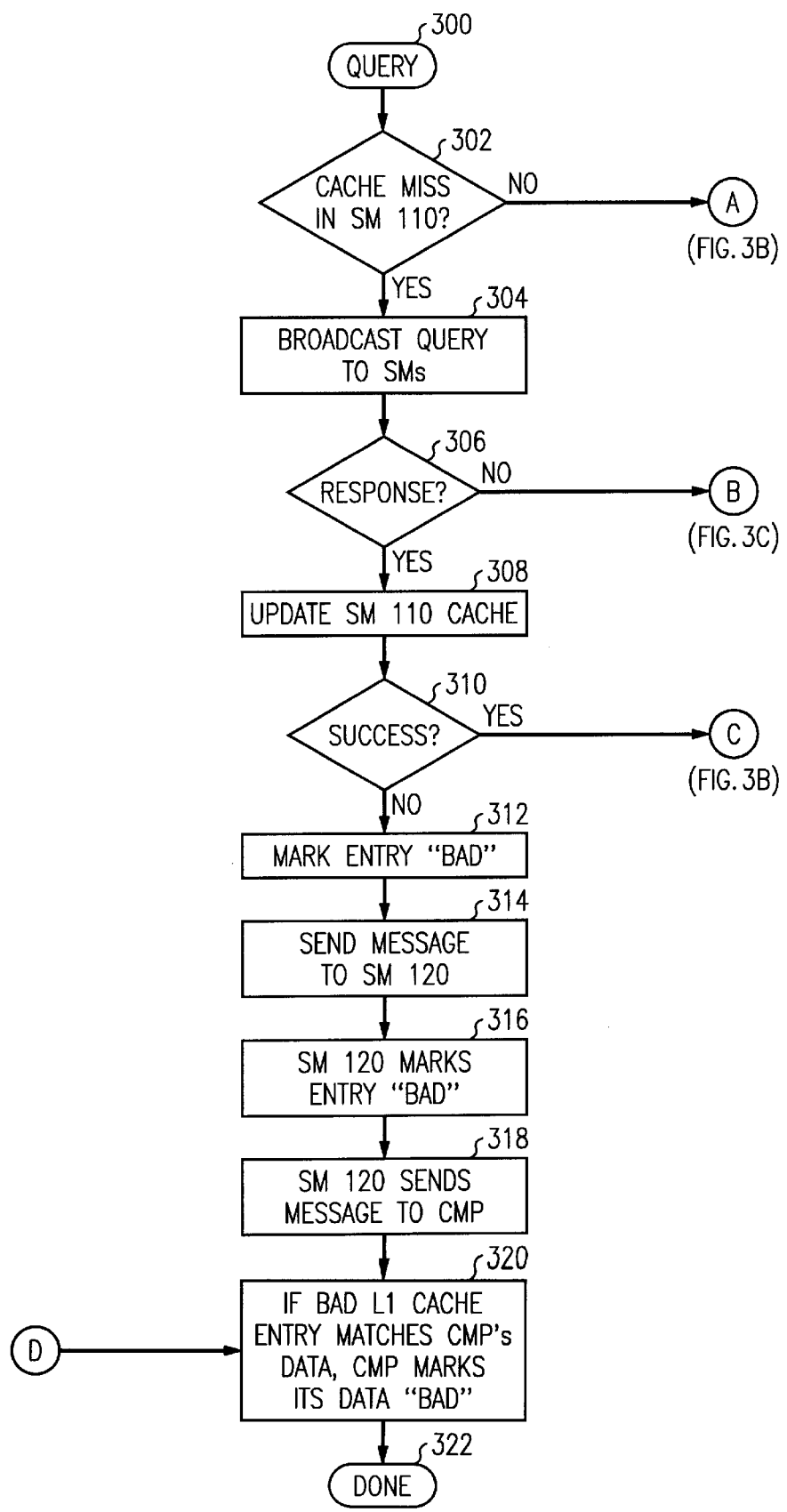

DISTRIBUTED VIRTUAL CACHE METHOD FOR USE IN A DATABASE QUERY CONTROL SYSTEM

TECHNICAL FIELD

This invention relates to the field of telephone switching, and, more specifically, to a distributed, virtual caching system which is suitable for switch-external database query control that provides rapid response for frequent database queries.

BACKGROUND OF THE INVENTION

Being "in touch" has become an increasingly important for some people, i.e., doctors, business executives, attorneys, etc., who have a strong need to be reached wherever they are. Many of these people have a telephone for business, a telephone for home, a mobile cellular telephone for the car, and/or a transportable telephone that can be carried around when not near one of the other telephones. Additionally, some professionals have multiple offices with a telephone in each office. Some work at home in conjunction with an office at a business location for when they are on premises with at least one telephone at each location. In the past, all of these telephones generally had different telephone numbers. As a result, a caller had to know or look up multiple telephone numbers and frequently had to make multiple calls in order to reach a person.

One solution to such problems is a so-called "follow me" service in which the user is assigned one number, i.e., 700-555-1234, and the call can be routed to the current location of the user. In such services, the switch, in response to the 700 number, send a query to a centralized database over a signaling network where the user registers his or her current telephone number. The switch, in response to receiving the current telephone number, can then route the call.

Additionally, local number portability (that is, a person being able to use one telephone number regardless of where they are located) causes additional queries to such localized databases where number portability information is kept. In this scenario, a call is made to a destination directory number, and the call is routed accordingly. However, at the end office where the call would normally be delivered, a determination is made that the call is to be delivered elsewhere. At this point, the destination switch makes a query to a centralized database to find the real destination for the telephone call.

Such use of centralized databases has been adequate in the past for services such as "800" services wherein the call volume has not been overwhelming. However, as more and more services use centralized databases in order to route calls, both the signaling network and the service nodes where these databases are located are becoming more congested with queries. Therefore, a problem in the art is that there is no system and method for achieving rapid response to such database queries.

SUMMARY OF THE INVENTION

This problem is solved and a technical advance is achieved in the art by a system and method for caching frequently called numbers so that call delivery time is shortened and the signaling network and service nodes are not overloaded by telephone number queries. Such results are achieved in, for example, a distributed control switching system wherein each processor that performs digit analysis includes an area of memory. This area of memory is used as a cache to store directory number translation information. In such a system, when a call arrives for a specified directory number (DN), if, after standard translation, the call cannot be normally routed, then the cache is consulted to determine whether the destination for that DN is in the cache. If it is, then the call is routed to the destination associated with the DN. If, however, the DN is not in the local cache, then a query is sent to one or more other units in the switch which may contain such caches in order to determine if these caches contain the destination. This "distributed" query is still faster than querying a centralized database because all data queries throughout the switch are carried out in parallel. Thus, a large cache can be searched more rapidly than by sending a signaling message through the signaling network to a service node then back through the signaling network.

Advantageously, there may be a further cache, or level-two cache resident in a central location in the system. If the distributed caches (level one) do not have the required data, then the level-two cache is searched. If the data is not found in either the level-one or the level-two cache, then a service node data search may be initiated.

BRIEF DESCRIPTION OF THE DRAWINGS

A more complete understanding of the invention may be obtained from consideration of the following description in conjunction with the drawings, in which.

DETAILED DESCRIPTION

Figure 1:
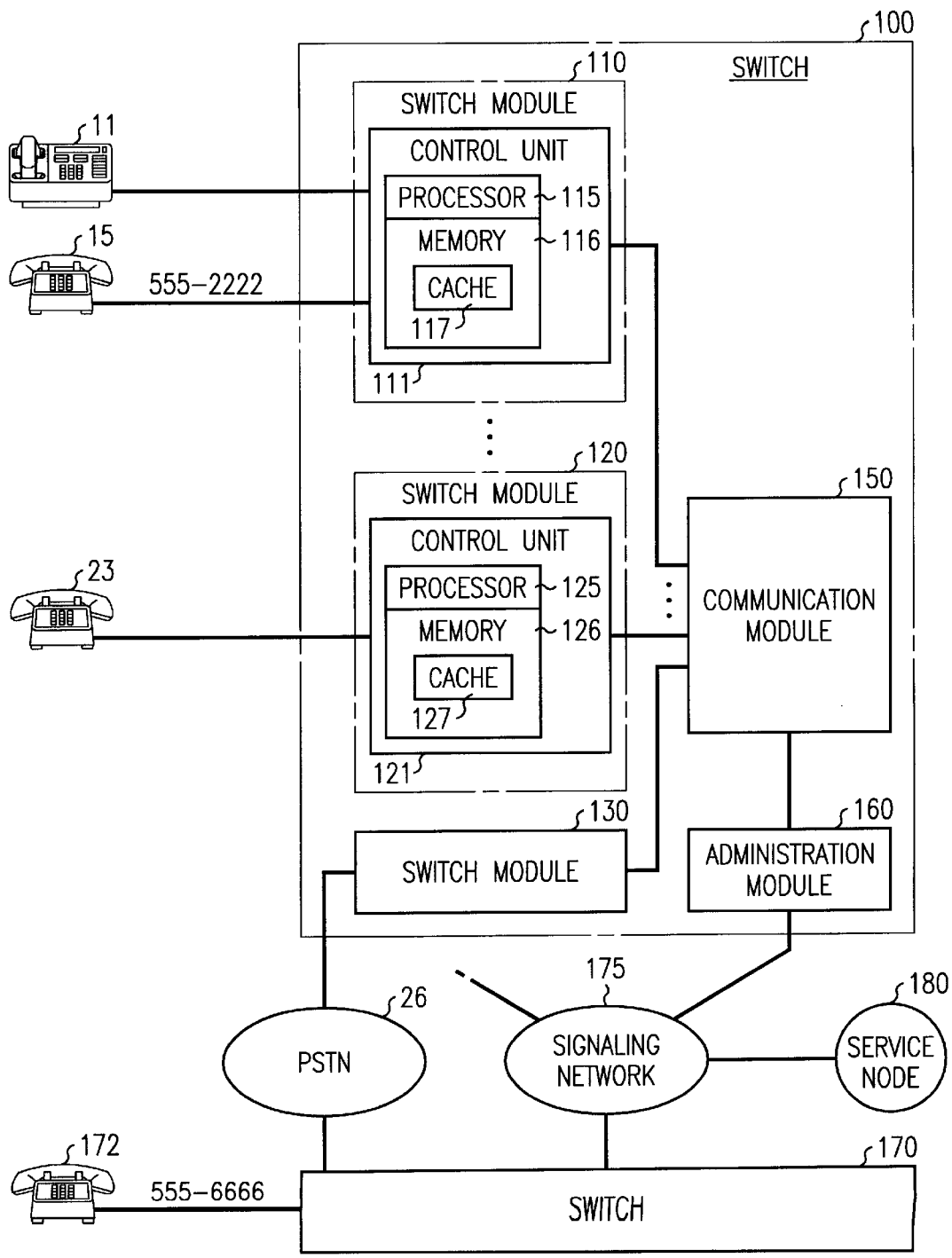
FIG. 1 is a block diagram of a switching network configuration, employing an exemplary embodiment of this invention.

This invention will be described in connection with a telephone switching system, as illustrated in FIG. 1, but the application of this method is much broader. For example, a caching system according to this invention may be used in a general purpose, program controlled computer network or in multiple parallel processing.

An exemplary method for a distributed virtual cache is described herein in the context of the telephone switching network configuration of FIG. 1, having two central office switches 100 and 170, an inter switch signaling network 175 (e.g. a common channel signaling CCS7 network) and illustrative communications stations including telephone station sets 21, 22, 23, and 172. Switches 100 and 170 are interconnected by the public switched telephone network 26, which may include intermediate switches.

Illustratively, switches 100 and 170 may be a distributed control analog or digital switch, such as a 5ESS® switch manufactured by Lucent Technologies and described in the AT&T Technical Journal, v.64, No. 6, July-August, 1985, pp. 1303–1564. Illustratively, switch 100 includes a plurality of switch modules (SMs) 110, 120, 130, each associated with a different set of telephone station sets or trunks. Each SM includes a control unit 111-121 for controlling connections to and from its associated telephone station sets or trunks. Switching module 110, for example, includes control unit 111 for controlling connections to and from telephone station sets 11 and 15. Switching module 120 includes control unit 121 for controlling connections to and from telephone station set 23.

Each control unit 111, 121 comprises a processor 115, 125 and memory 116, 126, respectively. Each memory 116, 126 includes a cache 117, 127 according to this exemplary embodiment of this invention, wherein processors 115, 125 store, for example, redirected telephone numbers.

The architecture of switch 100 includes communication module (CM) 150 as a hub, with switching modules 100, 120, and 130, and administrative module (AM) 160 emanating therefrom. To complete the description of switch 100, communications module 150 acts as a switch fabric for communication among switch modules and the administrative module 160. AM 160 provides coordination of functional components of switch 100 and human-machine interface. Switch 170 is shown connected to a telephone station set 172 for purposes of illustration. Signaling network 175 includes service node 180 attached thereto, for providing lookup tables for alternate routing, etc.

In an exemplary embodiment according to this invention, telephones 11 and 15 are used, for example, co-workers. The user of telephone 15 travels frequently and, thus, subscribes to a "follow me" type service. In this example, when the user of telephone 11 dials the number of the user telephone 15, i.e., 700 555-2000, under normal circumstances, when the processor 115 in control unit 111 of switch module 110 performs the lookup in the office dialing plan and sees the 700 prefix, it would communicate the received telephone number, i.e., 700 555-2000 and send that as a query message through communication module 115 to administration module 160. Administration module 160 sends a message through signaling network 175 to service node 180 where such translations reside. Service node 100 performs a lookup in its table and determines that the number is currently set to 555-2222. This information is routed back through signaling network 250, AM 160, CM 150, ultimately to processor 115, which then causes a connection to be made between telephone 11 and telephone 15. According to an exemplary embodiment of this invention, instead of switch module sending a message to service node 260 immediately, it first makes an inquiry in cache 117. If the number is relatively frequently dialed, as it would be in this instance, then the DN is found in cache 117 and, thus, the translation may be made more quickly and the call completed more rapidly than if a query is sent through the signaling.

Further supposing the user of telephone 23 to be another co-worker, if the user of telephone 23 desires to contact the user of telephone 15, a call is placed wherein processor 125 uses the same dialing plan as processor 115. In this instance, processor 125 will query cache 127 to determine if the alternate number is there. Supposing that the number is not there, then processor 125 will send a message through communication module 150 to all switch modules (110 and 130 in this example). Switch modules 110 and 130 will review their own caches to determine if that number is present. In this example, the number is kept in cache 117 and switch module 110 sends the number to processor 125, which then can complete the call to telephone 15. If the user of telephone 23 contacts the user of telephone 15 frequently, then the number may also be moved into cache 127.

Furthermore, if the user of telephone 15 moves to telephone 172 and registers a new number with service node 180, the users of telephones 11 and 23 may still quickly contact the user of telephone 172. As the special number is dialed, the number will eventually move into cache 117 then possibly into cache 127, thus causing a connection from either telephone 11 or 23 through PSTN 26, to switch 170, and ultimately to telephone 172.

In this scenario, the first time the user of telephone 11 calls the special number, a message will be sent through signaling network 175 to service node 180, as is known in the art. However, further calls will cause the number to be cached in cache 117. Thus, this invention provides a two-level caching system for rapidly connecting telephones without having to send messages through signaling networks to service nodes for the most frequently dialed numbers.

This exemplary embodiment, the algorithm used to update the cache may be any algorithm known in the art. However, it is preferred that the first in, first out FIFO algorithm not be used because this will cause the cache to be constantly updated which, of course, defeats the purpose. For example, a "least recently used" algorithm may be employed. In this algorithm, the cached item that is referenced the least is replaced by a new item. This algorithm ensures that frequently called numbers remain cache-resident. To ensure coherency further, the cache entries may be periodically erased, thus forcing a cache miss on all local levels and forcing an update from the central database.

Figure 2:
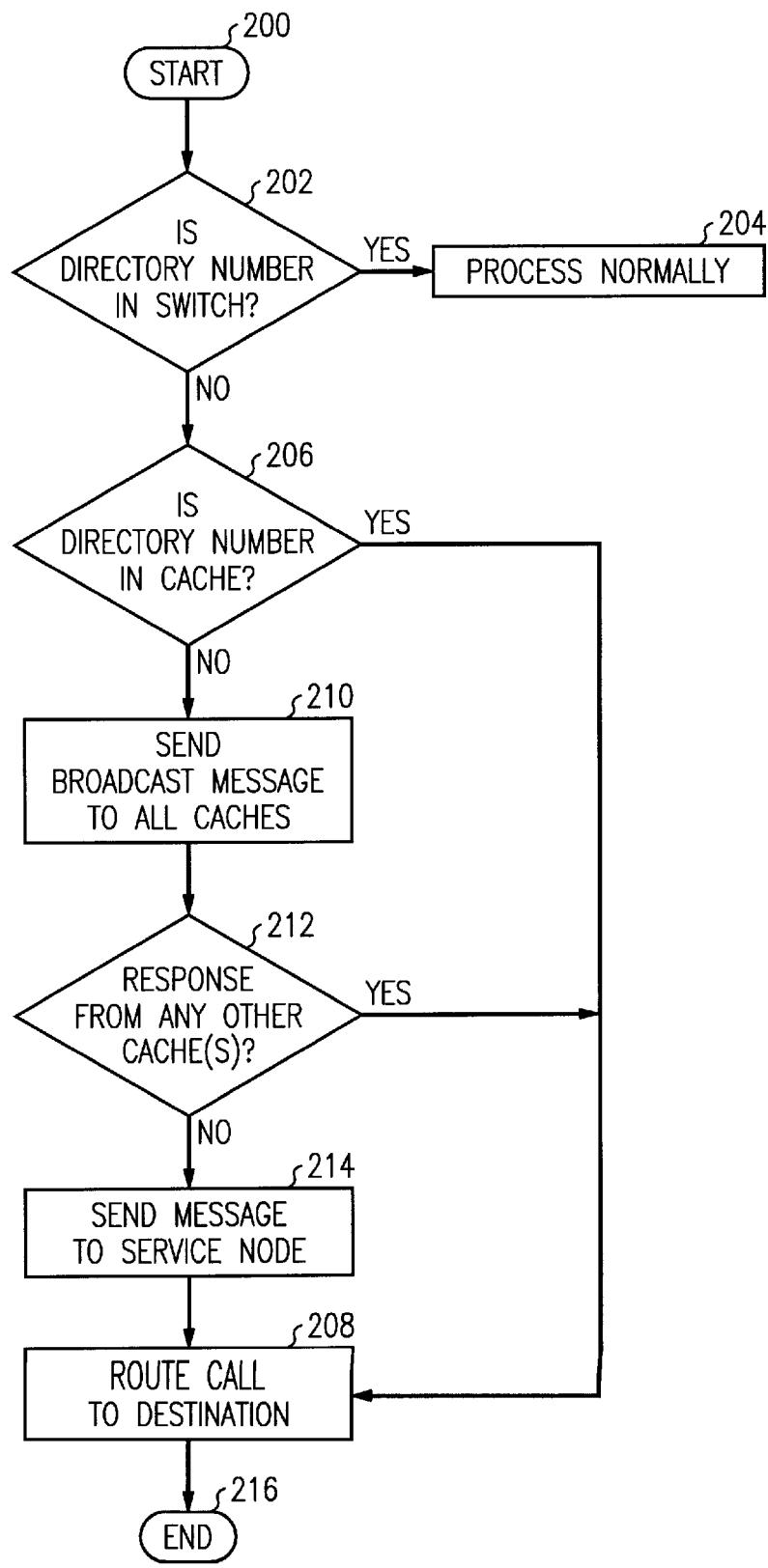
FIG. 2 is a flow chart describing a method according to this invention as used in the switching network of FIG. 1.

Turning now to FIG. 2, flow diagram of the hierarchical nature of the database search is shown. Processing starts in circle 200 and proceeds to decision diamond 202. In decision diamond 202, a determination is made if the destination directory number (DN) is found in the switch. If it is, then processing proceeds to box 204, where the call is processed normally. If the DN is not in the switch, then processing proceeds to decision diamond 206 where a determination is made if the DN is in the local cache. If the DN is in the local cache, then processing continues to box 208 where the call is routed to the new destination.

If, in decision diamond 206, the DN was not in the primary cache, then processing continues to action box 210, where a broadcast message is sent to all caches within the system. In this exemplary embodiment, a broadcast message would be sent via communication module 150, to switch modules 120 and 130. Processing then proceeds to decision diamond 212 where a determination is made if a response has been received from another cache. This could include setting a timer for waiting for a predetermined period of time or actually waiting for a "yes" response from any of the caches. If a hit is found in one of the caches, then the call is routed to the destination per action box 208.

If, in decision diamond 212 there is no further response from the other caches, then a message is sent to the service node as is known in the art in action box 214. The information is used to update the local cache and then the call is routed to destination 208 in action box 208 and processing ends in circle 216.

Figure 3B:
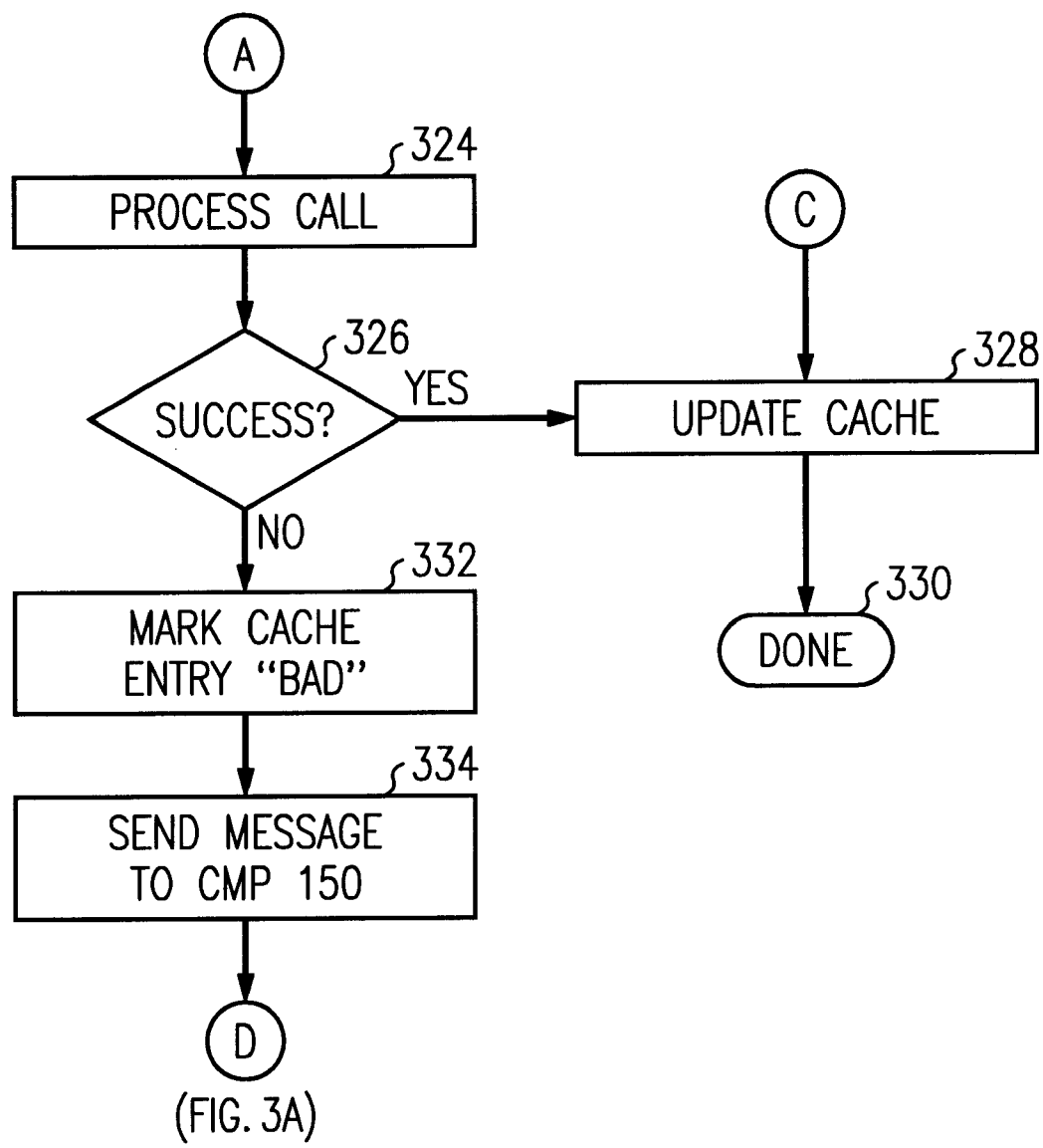
FIG. 3 is a flow chart describing a specific example of the operation of this invention in the context of the switching network of FIG. 1.
Figure 3C:
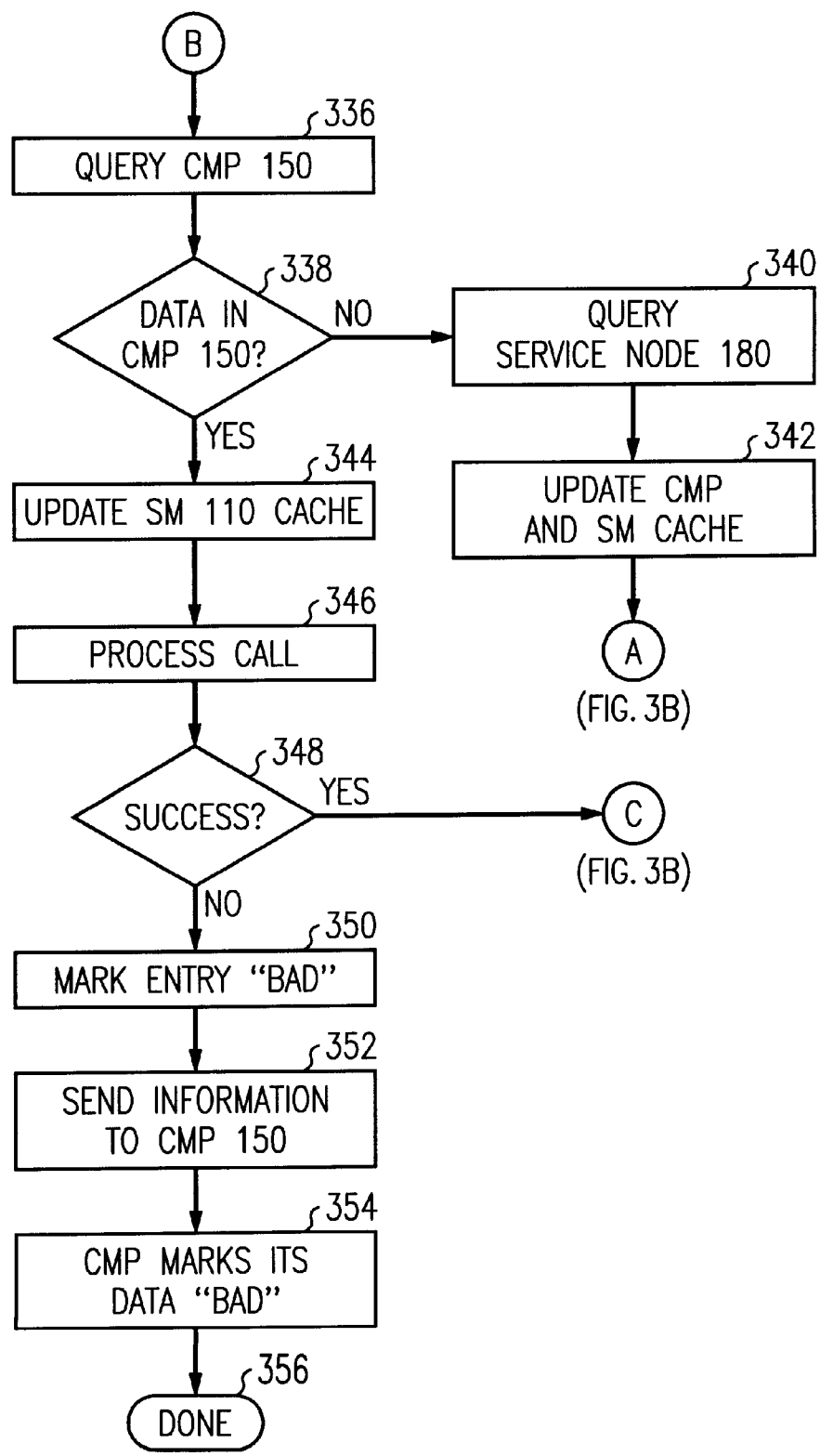

FIG. 3 describes a flow chart describing a specific example of the operation of the preferred embodiment of this invention in the context of the switching network of FIG. 1. FIG. 3 comprises FIGS. 3a, 3b, and 3c. For purposes of this example, assume that there are two switch modules, 110 and 120. Further, assume that there is a memory and a cache in communication module 150 providing a secondary, or level-two, cache. Finally, assume that the database in service node 180 is the main database. If a call originates in switch module 110, a query 300 is made. As a first step in such a query, a decision is made in decision diamond 302 whether the number was found in the cache. If there was a cache miss in decision diamond 302, then processing proceeds to action box 304 where the query is broadcast to all SMs. In decision diamond 306, a determination is made, after a predetermined period of time, whether there was a response from any of the other SMs. If there were a response in decision diamond 306, then the SM 110 cache is updated with information in action box 308.

A call is then placed to the number returned in the response. If this call is determined to be not successfully routed, in decision diamond 310 (as it would be, for example, if the user were no longer at that particular phone or the entry was bad), then processing proceeds to action box 312. In action box 312, the entry is marked as being bad and in action box 314, a message is sent to SM 120 to also mark its entry bad, in box 314. In box 316, SM 120 marks the entry bad, and in box 318, SM 120 sends a message to the CMP. In action box 320, if the level one (L1) cache entries match the CMP's cache data, the CMP marks its cache data as also being bad. Finally, processing ends in circle 322.

If, in decision diamond 302, there were a cache hit in SM 110, then processing proceeds through connector A to FIG. 3B. The call is processed using the number found in the cache in action box 324. A determination is made in decision diamond 326 whether the call was successfully completed. If the call were not successfully completed then the cache entry is marked as being bad in action box 332 and a message is sent in action box 334 to CMP 150. Processing then proceeds to connector D to FIG. 3A, action box 320.

If, in decision diamond 306 there is no response to the broadcast message from the other SM, then processing proceeds through connector B to FIG. 3C. In FIG. 3C, processing starts with a query to CMP's 150 cache in action box 336. A determination is made in decision diamond 338 whether the data is found in the CMP 150. If it is, then the cache in SM 110 is updated with the information from CMP 150 in action box 344. The call is then processed in action box 346.

If the call is not completed successfully, as determined in decision diamond 348, then the entry in SM 110 is marked bad in action box 350. SM 110 then sends the information to SMP 150 in action box 352, and in action box 354 the CMP marked its data as being bad. Processing is now completed at 356.

If, in decision diamond 338, the data is not found in CMP 150, then a query is sent in action box 340, to service node 180. When service node 180 responds, the CMP and SM caches are both updated in action box 342 and processing proceeds to connector A, as described above (FIG. 3B). If in decision diamonds 310 (FIG. 3A), 348 (FIG. 3C), or 326 (FIG. 3B) there is successful call completion, then the cache entry is updated (in action box 328) to indicate that a successful hit was found on the last call attempt, and processing ends at 330.

It is to be understood that the above-described embodiment is merely an illustrative principle of the invention and that many variations may be devised by those skilled in the art without departing from the scope of this invention. It is, therefore, intended that such variations be included within the scope of the claims.

I claim:

1. A method for retrieving data from database cache systems comprising the steps of:

querying a local cache for said data; and if said data is not found in said local cache, querying local caches on other systems in parallel.

2. A method according to claim 1 further including the step of:

if said data is not found in any of said other systems, then sending a request to a centralized data base.

3. A method for retrieving data for use in a distributed control telephone switching system, wherein said switching system comprises a plurality of processors, said method comprising the steps of:

querying a local cache in a processor to determine if said data is in said cache; and if said data is not in said cache, sending a query in parallel to all of the other processors to determine if said data is in any one of the caches of the other processors.

4. A fast caching system for finding data, said caching system comprising:

a first cache configured to search for the data;

a plurality of secondary caches configured to search for the data in parallel if the data is not found in the first cache.

5. A fast caching system according to claim 4 wherein the plurality of secondary caches are subdivided hierarchically and wherein each level of the hierarchy is searched in parallel if the data was not found in a previous level.

6. A fast caching system according to claim 4 further including a central data base configured to find the data if the data is not found in one of the plurality of secondary caches.

* * * * *